United States Patent [19]

Bettenhausen

[11] 4,320,862
[45] Mar. 23, 1982

[54] AUTOMOBILE REAR BAGGAGE CONTAINER

[76] Inventor: Merle M. Bettenhausen, 1019 Hollywood Ct., Indianapolis, Ind. 46234

[21] Appl. No.: 158,704

[22] Filed: Jun. 12, 1980

[51] Int. Cl.³ .................... B62R 9/06; B62D 35/00
[52] U.S. Cl. .................... 224/42.03 A; 224/42.42; 296/1 S
[58] Field of Search ............... 224/42.03 R, 42.03 A, 224/42.03 B, 42.04, 42.05, 42.06, 42.07, 42.08, 42.31, 42.32, 42.39, 42.4, 42.42, 273, 316; 296/1 C, 1 S, 37.1

[56] References Cited

U.S. PATENT DOCUMENTS

| | | | |
|---|---|---|---|
| 2,541,244 | 2/1951 | Hack | 224/42.07 |
| 3,718,225 | 2/1973 | Duren | 224/42.07 |
| 3,762,758 | 10/1973 | Wilkerson | 224/42.03 A |
| 3,923,221 | 12/1975 | Ballinger | 224/42.4 |
| 3,999,693 | 12/1976 | Cooper, Sr. | 224/42.03 A |

*Primary Examiner*—Stephen Marcus

[57] ABSTRACT

A baggage container and automobile combination for transporting baggage. A baggage container is removably mounted to the rear bumper of the automobile and has a pair of forwardly extending straps securing the baggage container to the rear wheel wells. An additional strap extends from the bottom wall of the container and is connected to the rear bumper. A pair of vertically adjustable brackets attached to the container extend between the trunk lid and automobile main body. A pair of vertically extending walls and a generally horizontally extending wall are slidably mounted to the box and extend forwardly engaging by magnetic means the automobile rear surface to provide a streamlined configuration between the automobile and container.

1 Claim, 4 Drawing Figures

AUTOMOBILE REAR BAGGAGE CONTAINER

BACKGROUND OF THE INVENTION

This invention is in the field of automobiles with baggage carriers. Traditionally, automobile owners have transported baggage either within the vehicle trunk or in a baggage container mounted atop the roof of the vehicle. The downsizing of automobiles has resulted in a reduction of the cargo space within the trunk and in some cases, the trunk has been completely eliminated. Further, the power developed by smaller automobile engines along with the actual reduction in the size of the automobile main body reduces the desirability of mounting the baggage atop the vehicle roof. First, the normal wind resistance of the baggage when mounted atop the roof of the automobile provides an overload of the engine. In addition, the lighter weight and smaller size of the automobile provides instability when heavy baggage is mounted above the vehicle.

Disclosed herein is a baggage container mountable to the rear of the vehicle providing a lower center of gravity as compared to baggage mounted atop the vehicle while at the same time taking advantage of the lower wind resistance by placing the baggage immediately behind the vehicle. The baggage container is provided with extendable walls to provide a streamlined contour thereby further reducing wind resistance. The two major disadvantages of instability and wind resistance are eliminated by the container disclosed herein.

SUMMARY OF THE INVENTION

One embodiment of the present invention is a device for transporting baggage comprising an automobile including a main body with a rear outer surface and a rear bumper, a box to receive baggage, said box being removably mounted atop said bumper, fastening means removably securing said box to said automobile, and wall means associated with said box and extending forward to said outer surface providing an aerodynamically blended contour between at least a portion of said box and said outer surface.

It is an object of the present invention to provide a new and improved device for transporting baggage.

A further object of the present invention is to provide a baggage container and automobile combination having a low center of gravity.

Yet another of the present invention is to provide a baggage container and automobile combination of streamlined contour.

In addition, it is an object of the present invention to provide a baggage container which is removably mounted to the rear portion of a variety of different types of automobiles.

Related objects and advantages of the present invention will be apparent from the following description.

DESCRIPTION OF THE PREFERRED EMBODIMENT

Figure 1:
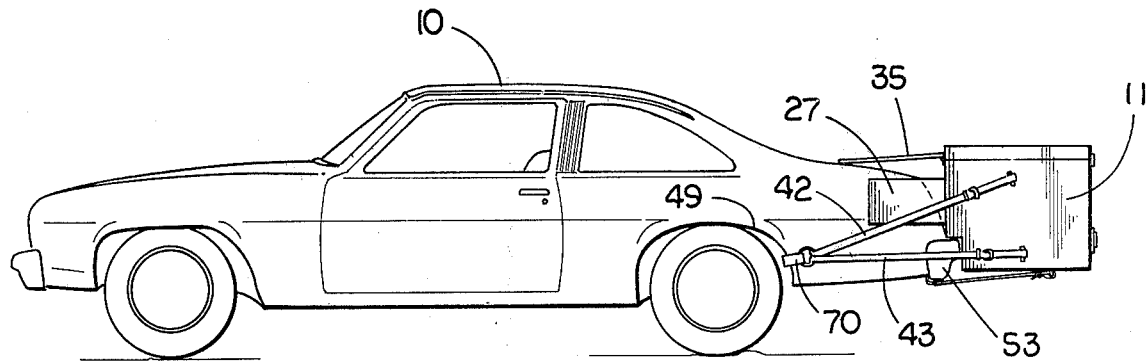
FIG. 1 is a side view of the automobile and baggage container combination incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a device for transporting baggage which includes an automobile 10 with a baggage container 11 removably mounted to the rear portion of the automobile. Such a combination is particularly advantageous if the automobile is relatively small size thereby precluding storage of the baggage within the trunk of the automobile or mounting the baggage atop the roof of the automobile causing stability problems and increasing the wind resistance.

Figure 3:
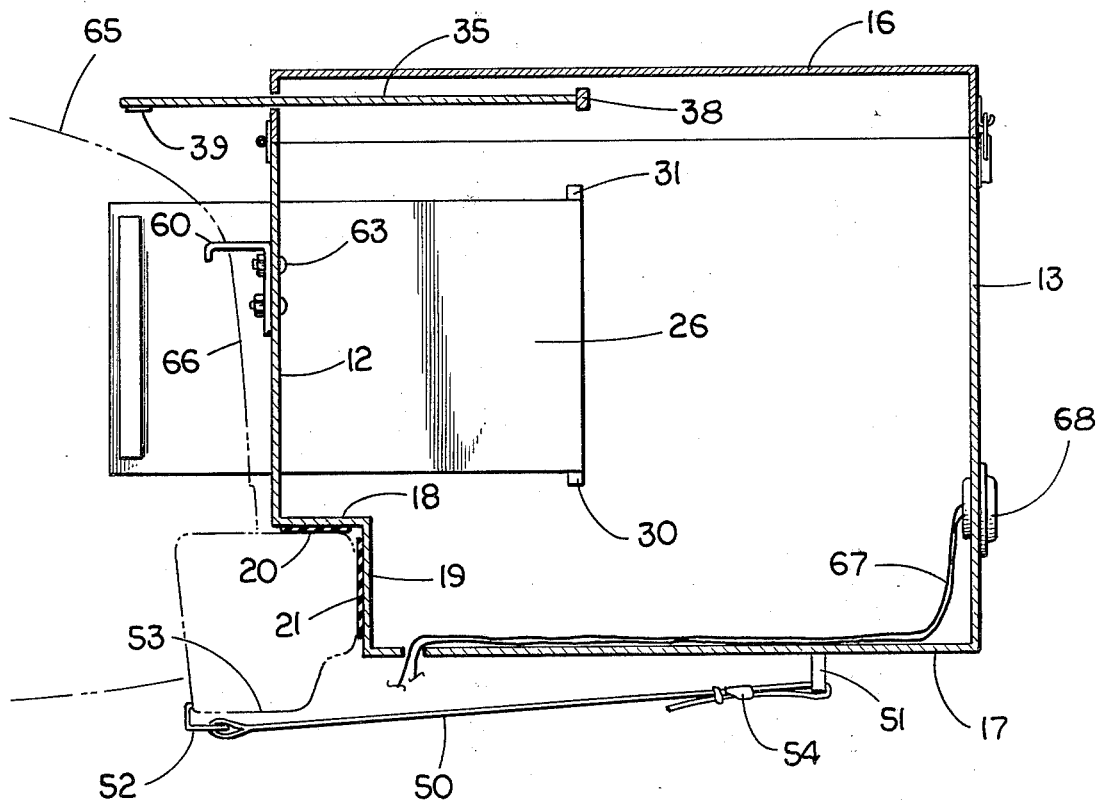
FIG. 3 is a cross-sectional view taken along line 3—3 of FIG. 2 and viewed in the direction of the arrows.

Container 11 has a pair of parallel walls 12 and 13 extending across the width of the automobile with walls 12 and 13 being joined to parallel end walls 14 and 15 extending the direction of travel. A lid 16 is pivotally mounted to wall 12 by a pair of conventional hinges 22 and 23. Clasps 18 and 19 (FIG. 4) are provided on wall 13 to enable the lid to be securely locked to the main body of the container. The bottom wall 17 of the container along with walls 14 and 15 form a recess along the forward edge portion receiving the bumper of the automobile. As shown in FIG. 3, walls 18 and 19 are joined together at right angles and also at right angles to respectively walls 12 and 17. Pads 20 and 21 are mounted respectively to walls 18 and 19 providing additional support and increasing the wear resistance of walls 18 and 19 relative to the rear bumper.

Three walls are slidably mounted to container 11 and extend forwardly to the outer surface of the automobile main body in order to minimize the drag or wind resistance of the container. A pair of vertically extending slots 24 and 25 is provided in wall 12 immediately adjacent walls 14 and 15, respectively. A pair of vertical walls 26 and 27 extend respectively through slots 24 and 25 and may be moved outwardly from the container until the enlarged inner ends of each wall 26 and 27 abuts the inner surface of wall 12 limiting further outward movement of the walls from the container. Wall 27 includes a pair of flanges 28 and 29 forming the enlarged inner end of wall 27 whereas wall 26 is provided with a pair of vertically extending flanges 30 and 31 likewise forming the enlarged inner end of wall 26. A pair of magnetic strips 32 and 33 are provided respectively on the mutually facing surfaces of walls 26 and 27 with the magnetic strips functioning to removably secure walls 26 and 27 to the metal outer surface of the main body of automobile 10. Walls 26 and 27 may be produced from a flexible material such as rubber or plastic to enable the walls to assume a blended streamline contour between the side walls of the rear portion of the automobile and container 11. For example, in FIG. 1, wall 27 is shown as extending forwardly from the container engaging the outside surface of the rear fender of the automobile.

A third wall 35 is of similar construction relative to walls 26 and 27 and is slidably received by a slot 36 provided in the forward-facing wall of lid 16. Wall 35 engages the upward-facing surface of the trunk of the automobile. In case the automobile is of a hatchback construction, wall 35 engages the rear hatchback door of the automobile. Wall 35 includes an enlarged inner end 38 to limit movement of the wall. As shown in FIG. 1, wall 35 thereby provides a blended contour between the automobile and the top portion of the container. Walls 26, 27 and 35 provide a means associated with the container which is extendable forward to the outer surface of the automobile providing an aerodynamically blended contour between at least a portion of the container and the outer surface of the automobile. Wall 35 may also be produced from a flexible material such as rubber or plastic and includes a magnetic strip 39 mounted to its downwardly facing surface to engage automobile 10.

Figure 2:
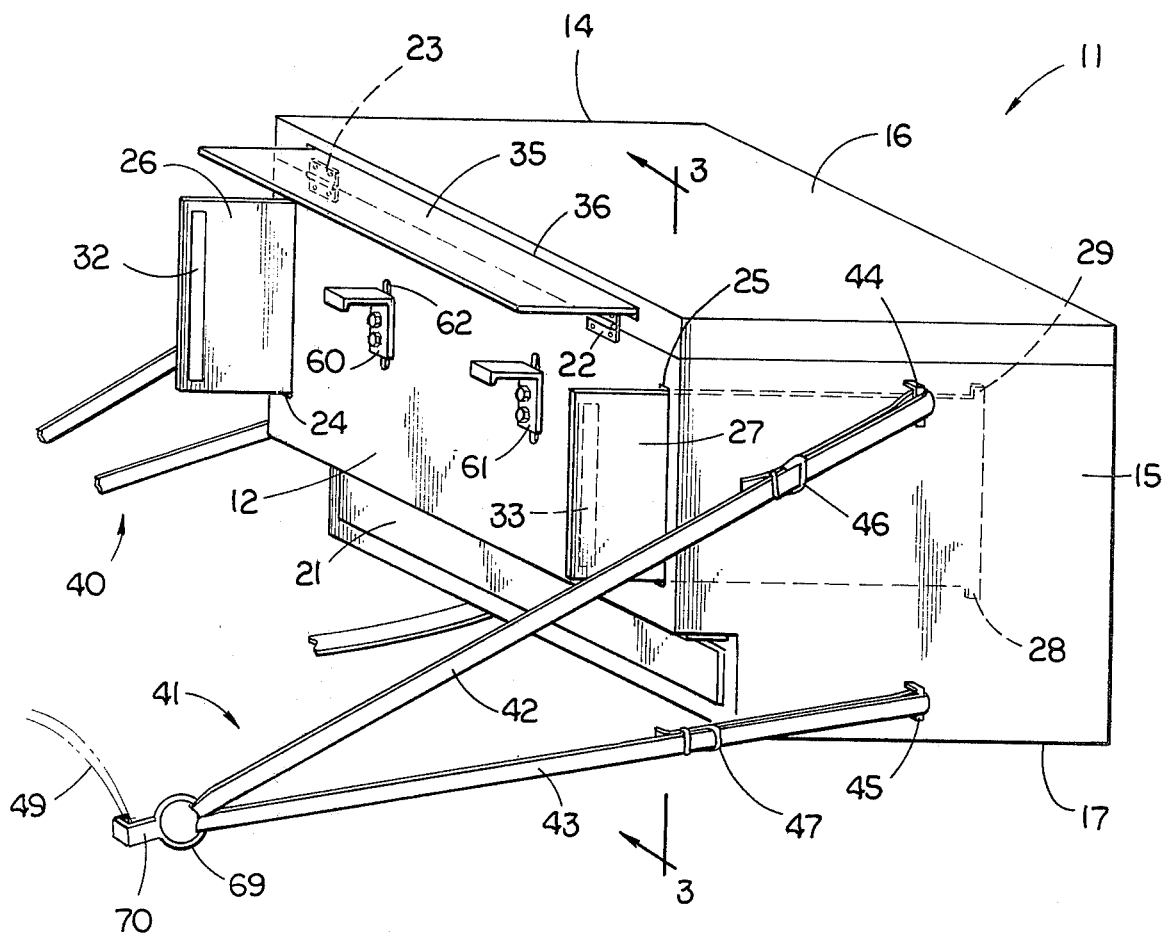
FIG. 2 is an enlarged fragmentary and perspective view of the baggage container shown in FIG. 1.
Figure 4:
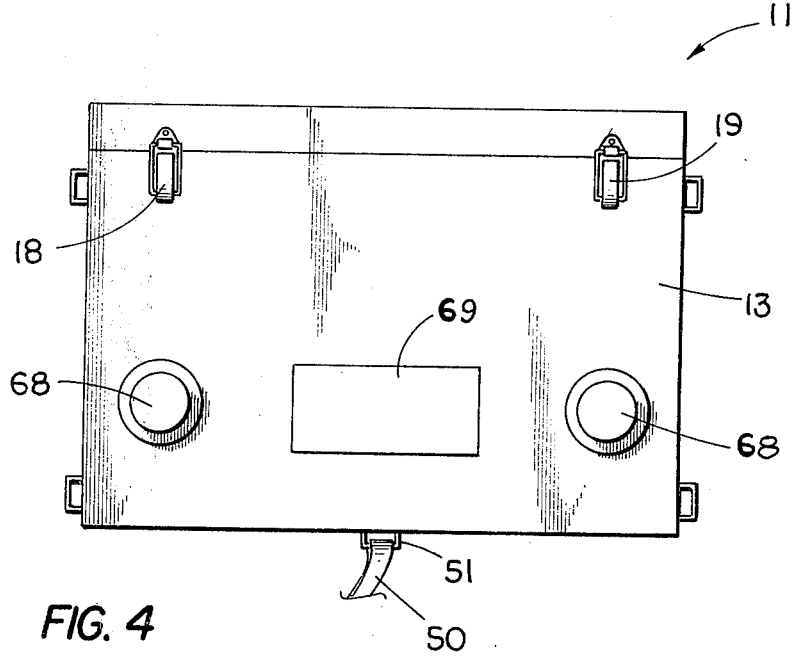
FIG. 4 is a rear view of the container of FIG. 1.

The baggage container shown in FIGS. 2–4 is provided with multiple means for securing the container to the automobile. First, two pairs of straps are attached to the opposite side walls of the container and extend forwardly to engage by means of clamps the rear wheel wells of the automobile. Further, a strap extends downwardly from the bottom wall of the container being connected by a clamp to the bottom bumper. Third, a pair of brackets are provided on the forward wall of the container and are hookingly engaged between the trunk lid and main body of the automobile. All three means for securing the container to the automobile will not be necessary in all instances, depending upon the particular configuration of the automobile as well as the weight placed within the container.

The two pairs of forwardly extending straps 40 and 41 (FIG. 2) are identical and thus, the following description of pair 41 applies equally to pair 40. Pair 41 includes two flexible straps 42 and 43 attached to ring 69 of clamp 70 and extend rearwardly therefrom in a V-shaped configuration. Straps 42 and 43 may be of fabric construction or of a rubber material. Straps 42 and 43 are attached respectively to a pair of handles 44 and 45 extending outwardly from the top and bottom portion of wall 15. Two conventional buckles 46 and 47 are provided on straps 42 and 43 to enable the straps to be lengthened or shortened, depending upon the distance from the container to the rear wheel well. Clamp 70 has a horseshoe configuration and may be slipped over the edge or rib partially surrounding the wheel well. For example, in FIG. 1, clamp 70 is shown as extending partially around the outer edge of rear wheel well 49.

Many variations are contemplated and included in the present invention. For example, in lieu of attaching the two pairs of straps to the rear wheel wells, the pairs of straps could be attached to the side walls of the automobile by means of suction cups. To increase the stability of the container, a strap 50 (FIG. 3) of material similar or identical to the previous straps discussed herein, is connected to handle 51 attached to the bottom wall 17 of the container. Strap 50 extends forwardly being fixedly attached to a C-shaped clamp 52 extendable around and engaged with the lower wall of bumper 53. A buckle 54 is provided on strap 50 to shorten or lengthen the strap thereby increasing or decreasing the tension of the strap.

In certain instances, it may be desirable to attach the baggage container to the automobile by means in lieu of or in addition to the straps previously discussed. Thus, inverted L-shaped brackets 60 and 61 (FIG. 2) are adjustably mounted to the forward wall 12 of container 11. Each bracket 60 and 61 has a pair of conventional fastening devices extending therethrough with two slots provided in wall 12 receiving the fastening devices thereby allowing the brackets to be adjusted in a vertical direction, depending upon the distance from the rear bumper to the junction between the trunk lid and vehicle main body. For example, slot 62 receives fasteners 63 (FIG. 3) attaching bracket 60 to wall 12. The trunk lid 65 is shown in phantom in FIG. 3 with the lower edge portion of the trunk lid terminating immediately above bracket 60 and with bracket 60 extending between trunk lid 65 and the main body 66 of the automobile. In the event the automobile is of a hatchback construction, then bracket 60 and 61 would extend between the hatchback door and the main body. The horizontal portion of each bracket 60 and 61 has a downwardly turned outer edge to provide a gripping engagement between the brackets and the automobile.

Container 11 is sized to fit atop the rear bumper of the automobile with the lid of the container being lower in elevation than the rear window of the automobile providing an unobstructed view. The container extends across the width of the automobile thereby covering the rear brake lights and turn signals. Thus, a pair of auxiliary turn signal and brake lights 68 are mounted to the rear wall 13 of the container and are connected by conventional wiring 67 to the automobile electric system. A bracket 69 on wall 13 is provided to facilitate the mounting of the automobile license plate directly to the container rear wall between lights 68.

It will be obvious from the above description that the present invention provides a new and improved device for transporting baggage. In particular, an advantage of the present invention is the combination of baggage container and automobile having a relatively low center of gravity with less drag or wind resistance as compared to the baggage containers presently in use. The baggage container is removably mounted to the vehicle and may be used with a variety of different sized and configured automobiles.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device for transporting baggage comprising:
    an automobile including a main body with a rear outer surface and rear bumper;
    a box to receive baggage, said box being removably mounted atop said bumper;
    fastening means removably securing said box to said automobile;
    wall means associated with said box and extending forward to said outer surface providing an aerodynamically blended contour between at least a portion of said box and said outer surface, and;
    said wall means includes a pair of side walls extendable from opposite sides of said box to said rear outer surface and a first wall extendable from said top portion of said box to said rear outer surface, said wall means includes magnetic means mounted to said first wall and said side walls to removably secure each to said rear outer surface, said first wall and said side walls are mounted to said box and are flexible to assume a blended contour between said box and automobile, said box is slotted slidably receiving said first wall and said side walls which have enlarged inner ends limiting movement relative to said box.

* * * * *